United States Patent
Yilmaz et al.

(10) Patent No.: US 10,506,438 B2
(45) Date of Patent: Dec. 10, 2019

(54) MULTI-RAT ACCESS STRATUM SECURITY

(71) Applicant: Telefonaktiebolaget LM Ericsson (publ), Stockholm (SE)

(72) Inventors: Osman Nuri Can Yilmaz, Espoo (FI); Icaro L. J. da Silva, Bromma (SE); Karl Norrman, Stockholm (SE); Paul Schliwa-Bertling, Ljungsbro (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 15/500,285

(22) PCT Filed: Dec. 3, 2015

(86) PCT No.: PCT/EP2015/078520
§ 371 (c)(1),
(2) Date: Jan. 30, 2017

(87) PCT Pub. No.: WO2017/092813
PCT Pub. Date: Jun. 8, 2017

(65) Prior Publication Data
US 2018/0041901 A1 Feb. 8, 2018

(51) Int. Cl.
*H04L 29/06* (2006.01)
*H04W 12/08* (2009.01)
(Continued)

(52) U.S. Cl.
CPC ........... *H04W 12/08* (2013.01); *H04W 12/04* (2013.01); *H04W 12/10* (2013.01);
(Continued)

(58) Field of Classification Search
None
See application file for complete search history.

(56) References Cited

U.S. PATENT DOCUMENTS 8,041,335 B2 * 10/2011 Khetawat .............. H04L 63/104
455/404.2
8,483,174 B2   7/2013 Ahmavaara et al.
(Continued)

FOREIGN PATENT DOCUMENTS

EP   2291048 A1   3/2011
EP   2579648 A1   4/2013
(Continued)

OTHER PUBLICATIONS

Xu, Fangmin et al. Architecture for Next-Generation Reconfigurable Wireless Networks using Cognitive Radio. 2008 3rd International Conference on Cognitive Radio Oriented Wireless Networks and Communications. https://ieeexplore.ieee.org/stamp/stamp.jsp?tp=&arnumber=4562537 (Year: 2008).*
(Continued)

*Primary Examiner* — Jeremiah L Avery
(74) *Attorney, Agent, or Firm* — Coats & Bennett, PLLC

(57) ABSTRACT

The present disclosure generally relates to the field of security context setup. More specifically, the present disclosure relates to techniques of supporting security context setup in a wireless communication network. A method embodiment relates to supporting security context setup in a wireless communication network, the method comprising initiating (S304), by a radio access network (RAN) element (200) of the wireless communication network, Access Stratum (AS) security context setup for a first Radio Access Technology (RAT) and a second RAT in a common signaling procedure.

23 Claims, 10 Drawing Sheets

(51) Int. Cl.
*H04W 12/04* (2009.01)
*H04W 12/10* (2009.01)
*H04W 74/08* (2009.01)
*H04W 60/00* (2009.01)
*H04W 88/06* (2009.01)
*H04W 8/04* (2009.01)

(52) U.S. Cl.
CPC ......... *H04W 60/005* (2013.01); *H04W 74/08* (2013.01); *H04W 8/04* (2013.01); *H04W 88/06* (2013.01)

(56) References Cited

U.S. PATENT DOCUMENTS

| | | | |
|---|---|---|---|
| 8,798,632 B2* | 8/2014 | Forsberg | H04L 63/06 455/439 |
| 9,131,412 B2* | 9/2015 | Geary | H04W 12/02 |
| 9,699,823 B2* | 7/2017 | Park | H04L 1/1812 |
| 9,817,720 B2* | 11/2017 | Horn | H04W 12/04 |
| 2010/0120420 A1 | 5/2010 | Agashe et al. | |
| 2010/0202618 A1* | 8/2010 | Yang | H04L 63/068 380/277 |
| 2010/0246533 A1 | 9/2010 | Lundin et al. | |
| 2010/0272263 A1* | 10/2010 | Yao | H04W 8/20 380/270 |
| 2011/0159841 A1* | 6/2011 | Escott | H04W 12/04 455/410 |
| 2012/0140743 A1* | 6/2012 | Pelletier | H04W 72/0453 370/335 |
| 2012/0163336 A1* | 6/2012 | Adjakple | H04W 12/04 370/331 |
| 2012/0238208 A1* | 9/2012 | Bienas | H04W 8/24 455/41.2 |
| 2012/0311335 A1* | 12/2012 | Fransen | H04L 63/06 713/170 |
| 2013/0010701 A1 | 1/2013 | Uchiyama et al. | |
| 2013/0044709 A1* | 2/2013 | Adjakple | H04W 76/15 370/329 |
| 2013/0295939 A1 | 11/2013 | Wegmann et al. | |
| 2014/0254528 A1 | 9/2014 | Quan et al. | |
| 2014/0269613 A1* | 9/2014 | Tiwari | H04W 36/0022 370/331 |
| 2014/0302850 A1* | 10/2014 | Young | H04W 88/04 455/436 |
| 2014/0349633 A1* | 11/2014 | Sajadieh | H04W 8/18 455/418 |
| 2015/0043537 A1* | 2/2015 | Chen | H04W 12/04 370/331 |
| 2015/0049707 A1 | 2/2015 | Vajapeyam et al. | |
| 2015/0215836 A1 | 7/2015 | Srivastava et al. | |
| 2015/0334766 A1* | 11/2015 | Lee | H04W 48/12 455/426.1 |

FOREIGN PATENT DOCUMENTS

| | | |
|---|---|---|
| EP | 2648437 A1 | 10/2013 |
| GB | 2492799 A | 1/2013 |
| JP | 2006517774 A | 7/2006 |
| WO | 2004073282 | 8/2004 |
| WO | 2008020788 A1 | 2/2008 |
| WO | 2010054340 A1 | 5/2010 |
| WO | 2011125675 A1 | 10/2011 |
| WO | 2014136434 A1 | 9/2014 |
| WO | 2016130061 A1 | 8/2016 |
| WO | 2017092814 A1 | 6/2017 |

OTHER PUBLICATIONS

Annoni, Marco et al. Radio Access Networks beyond 3G: A First Comparison of Architectures. 12th IEEE International Symposium on Personal, Indoor and Mobile Radio Communications. https://ieeexplore.ieee.org/stamp/stamp.jsp?tp=&arnumber=965334 (Year: 2001).*

Lei, Haipeng et al. Analysis and Simulation for Radio Access Network Architecture of 3GPP Long Term Evolution. 2007 IEEE 18th International Symposium on Personal, Indoor and Mobile Communications. https://ieeexplore.ieee.org/stamp/stamp.jsp?tp=&arnumber=4394254 (Year: 2007).*

Forsberg; "LTE Security"; GSM Security; Jan. 1, 2012; pp. 33 and 124; XP002755836; Somerset, Great Britain.

Claes Tidestav; "Massive Beamforming in 5G Radio Access"; Ericsson Research Blog; Retrieved from the Internet: URL:https://www.ericsson.com/research-blog/5g/massive-beamforming-in-5g-radio-access/ [retrieved on Nov. 15, 2016; Mar. 19, 2015, pp. 1-9.

Da Silva et al; "Tight intergration of new 5G air interface and LTE to fulfill 5G requirements"; Retrieved from the Internet: URL:http://ieeexplore.ieee.org/search/searchresult.jsp?newsearch=true&queryText=Tight%20integration%20of%20new%205G%20air%20interface%20and%20LTE%20to%20fulfill%205G%20requirements [retrieved on Oct. 2, 2015]; 81st Vehicular Technology Conference (VTC Spring); IEEE Conference Publications; 2015, pp. 1-5.

3rd Generation Partnership Project; "Technical Specification Group Radio Access Network; Evolved Universal Terrestrial Radio Access (E-UTRA); Radio Resource Control (RRC); Protocol specification (Release 12)"; Technical Specification; 3GPP TS 36.331 V12.7.0; Sep. 2015; pp. 1-453; Sophia Antipolis, Valbonne, France.

3rd Generation Partnership Project; "Technical Specification Group Services and System Aspects; 3GPP System Architecture Evolution (SAE); Security architecture (Release 13)"; Technical Specification; 3GPP TS 33.401 V13.0.0; Sep. 2015; pp. 1-131; Sophia Antipolis, Valbonne, France.

3rd Generation Partnership Project; "Technical Specification Group Services and System Aspects; 3GPP System Architecture Evolution (SAE); Security aspects of non-3GPP accesses (Release 13)"; Technical Specification; 3GPP TS 33.402 V13.0.0; Sep. 2015; pp. 1-56; Sophia Antipolis, Valbonne, France.

3rd Generation Partnership Project; "Technical Specification Group Radio Access Network; Evolved Universal Terrestrial Radio Access Network (E-UTRAN); Architecture description (Release 12)"; Technical Specification; 3GPP TS 36.401 V12.2.0; Mar. 2015; pp. 1-21; Sophia Antipolis, Valbonne, France.

3rd Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Technical Specification; 3GPP TS 36.300 V13.1.0; Sep. 2015; pp. 1-254; Sophia Antipolis, Valbonne, France.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 12)", Technical Specification; 3GPP TS 36.321 V12.7.0, Sep. 2015; pp. 1-77, Sophia Antipolis, Valbonne, France.

* cited by examiner

MULTI-RAT ACCESS STRATUM SECURITY

TECHNICAL FIELD

The present disclosure generally relates to the field of security context setup. More specifically, the present disclosure relates to techniques of supporting security context setup in a wireless communication network.

BACKGROUND

Security is a crucial aspect in today's mobile communication systems. For example, the security design of Long Term Evolution (LTE) provides compartmentalization. The compartmentalization mainly consists of ensuring that if an attacker breaks the security of one function, only that function is compromised. For example, there is one key used for encryption of the Radio Resource Control (RRC) protocol and another key used for integrity protection of the RRC protocol. RRC is a signaling protocol which uses lower layers for segmentation and reliable in-order delivery of signaling messages. RRC is suitable for messages of any size requiring reliable delivery such as user equipment (UE) configuration. In LTE and LTE-advanced (LTE-a), RRC is involved in the Non-Access Stratum (NAS) message exchange between a UE and a Mobility Management Entity (MME) as well as to provide various control-plane functions both on the UE and the evolved NodeB (eNodeB or in short eNB).

Access Stratum (AS) security is comprised of integrity protection of control plane (i.e., RRC signalling) and the ciphering of both the control and user planes. If an attacker breaks the RRC encryption key, the attacker can decrypt and read all RRC messages. However, since the integrity key is different from the encryption key, the attacker cannot modify or inject RRC messages. Neither can an attacker that has broken the RRC encryption key use that to eavesdrop on Data Radio Bearers (DRBs) since they use separate encryption keys (and vice versa). Another part of the compartmentalization design is that each eNB uses a separate set of keys. The rationale is that this ensures that an attacker breaking in to one eNB does not gain any information about data transmitted between a UE and another physically different eNB. To maintain the property that breaking into one physical Radio Access Network (RAN) node, i.e., an eNB, does not help in attacking another RAN node, the assisting eNB should use its own key set separate from the key set used in the anchor eNB, however it can be derived from the anchor eNB as in LTE dual connectivity.

Typically, when a new Radio Access Technology (RAT) is standardized, this is done by also introducing a separate Core Network catering for that RAT and 3GPP introduces mechanisms to move from one RAT to another RAT with minimal service interruption via the Core Network. Hence, in any case, moving from one RAT to another RAT means establishing a RRC connection towards the target RAT and removing the RRC connection from the source RAT, and because those RRC connections terminate in different logical nodes anchoring in different Core Networks (i.e., are completely separate UE connections), there is no possibility of synergy between them.

Signaling bearer and/or data bearer establishment and/or signaling bearer and/or data bearer recovery requires a number of signaling steps, resulting in e.g. signaling overhead and/or long signaling duration. Current signaling procedures for security context setup have not been designed or at least optimized to support a RAN architecture which is comprised of multiple air interfaces as in multi-RAT networks. This is even the case when the first RAT and second RAT connections of the UE would be toward the same, or in other words, a shared radio node and/or core network node.

Still further, security context may be different for different RATs (despite the tight integration) or standard releases or UE capabilities or device categories. For example, there may be different length requirements for the security keys of different RATs or the network termination may be in separate nodes, requiring separate sets of keys.

SUMMARY

Accordingly, there is a need for an improved technique for supporting security context setup in a multi-RAT wireless communication network.

According to a first aspect, a method of supporting security context setup in a wireless communication network is provided. The method comprises initiating, by a radio access network (RAN) element of the wireless communication network, Access Stratum (AS) security context setup for a first Radio Access Technology (RAT) and a second RAT in a common signaling procedure.

In this way, signaling for AS security context setup for the first and second RAT, i.e. a multi-RAT environment, is reduced. As a consequence, multi-RAT security context setup can be simplified.

The term Radio Access Technology (RAT) may be understood as the underlying physical connection technique for a radio based communication network. The radio access network element may comprise or be configured as a base station of a radio access network.

The common signaling procedure may comprise the exchange of one or more messages that relate to both the first RAT and the second RAT.

The method may comprise receiving, by the RAN element, first RAN key material from a core network (CN) element of the wireless communication network. The first RAN key material enables the RAN element to initiate the AS security context setup for the first RAT. The method further comprises receiving, by the RAN element, second RAN key material from the CN element of the wireless communication network. The second RAN key material enables the RAN element to initiate the AS security context setup for the second RAT.

In this case, two separate key materials, one for the first RAT and one for the second RAT, may be signaled to the RAN. The key material may be used to set up the security context. The key material received from CN may but does not have to be directly used in the security context setup, e.g. may be used later on.

The method may comprise receiving, by the RAN element, first RAN key material from a CN element of the wireless communication network. The first RAN key material enables the RAN element to initiate the AS security context setup for the first RAT. The method may further comprise deriving, by the RAN element, second RAN key material from the received first RAN key material. The second RAN key material enables the RAN element to initiate the AS security context setup for the second RAT.

In this case, the first RAN key material for the first RAT may be used to derive the key material for the second RAT. The key material may then be used to set up the security context.

The step of initiating the AS security context setup may include directly using the received first RAN key material for initiating the AS security context setup for the first RAT.

Alternatively, the step of initiating the AS security context setup may include deriving third RAN key material from the received first RAN key material and using the derived third RAN key material for initiating the AS security context setup for the first RAT. For example, the first RAN key material received from the CN may but does not have to be directly used in the security context setup, e.g. may be used later on. For example, a third RAN key material may be derived from the first RAN key material and the third RAN key material may be used for setting up the security context for the first RAT. As the second RAN key material is derived from the received first RAN key material the signaling for AS security setup for the first and second RAT, i.e. a multi-RAT environment, is even further reduced. As a consequence, multi-RAT security context setup can be simplified even further.

In one or more embodiments, the step of initiating the AS security context setup may comprise transmitting, by the RAN element, a common AS security mode command message for the first RAT and the second RAT to a wireless communication device of the wireless communication network.

The method may comprise receiving, by the RAN element, an AS security mode complete message informing the RAN element of the completion of the AS security context setup for the first RAT and the second RAT.

The RAN element may correspond to the RAN element implementing the first RAT. Further, the RAN element may correspond to or may be different from the RAN element implementing the second RAT.

According to a second aspect, a method of supporting security context setup in a wireless communication network is provided. The method comprising informing, by a core network (CN) element of the wireless communication network, a radio access network (RAN) element of the wireless communication network, to initiate Access Stratum (AS) security context setup for a first Radio Access Technology (RAT) and a second RAT in a common signaling procedure.

The method may comprise receiving, by the CN element from a wireless communication device, information about security capabilities of the wireless communication device regarding the first RAT and the second RAT.

The method may comprise initiating, by the CN element, Non Access Stratum (NAS) security context setup for the first RAT and the second RAT in a common signaling procedure.

In this way, signaling for NAS security context setup for the first and second RAT, i.e. a multi-RAT environment, is reduced. As a consequence, multi-RAT security context setup can be simplified even further.

The common signaling procedure may comprise the exchange of one or more messages that relate to both the first RAT and the second RAT.

The step of initiating the NAS security context setup may comprise requesting, by the CN element, a wireless communication device to perform authentication towards the CN element.

The method may comprising deriving, by the CN element, CN key material enabling a wireless communication device to perform authentication for the first RAT and enabling the wireless communication device to perform authentication for the second RAT.

The method may comprise transmitting, by the CN element, the CN key material to the wireless communication device.

The method may comprise receiving, by the CN element, an authentication response message from the wireless communication device.

The method may comprise deriving, by the CN element, CN key material for integrity protection and ciphering of NAS communication.

The method may comprise transmitting, by the CN element, an NAS security mode command message for the first RAT and the second RAT to the wireless communication device. The NAS security mode command message enables the wireless communication device to derive the CN key material for integrity protection and ciphering of NAS communication.

The method may comprise receiving, by the CN element, an NAS security mode complete message for the first RAT and the second RAT from the wireless communication device.

According to a third aspect, a method of supporting security context setup in a wireless communication network is provided. The method comprises receiving, by a wireless communication device of the wireless communication network from a radio access network (RAN) element of the wireless communication network in a common signaling procedure, information enabling the wireless communication to set up an Access Stratum (AS) security context for a first Radio Access Technology (RAT) and a second RAT. The method further comprises setting up, by the wireless communication device, the AS security context for the first RAT and the second RAT.

The method may comprise receiving, by the wireless communication device from the RAN element of the wireless communication network, a common AS security mode command message for the first RAT and the second RAT.

The method may comprise transmitting, by the wireless communication device, an AS security mode complete message to the RAN element. The AS security mode complete message may inform the RAN element of the completion of the AS security context setup for the first RAT and the second RAT.

The method may comprise transmitting, by the wireless communication device to a core network (CN) element of the wireless communication network, information about security capabilities of the wireless communication device regarding the first RAT and the second RAT.

The method may comprise receiving, by the wireless communication device from a CN element, a request to perform authentication towards the CN element.

The method may comprise transmitting, by the wireless communication device, an authentication response message to the CN element.

The method may comprise receiving, by the wireless communication device, an NAS security mode command message for the first RAT and the second RAT from the CN element. The method may further comprise deriving, by the wireless communication device, CN key material for integrity protection and ciphering of NAS communication for the first RAT and the second RAT from the received NAS security mode command message.

The method may comprise transmitting, by the wireless communication device, an NAS security mode complete message for the first RAT and the second RAT to the CN element.

According to a fourth aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a fifth aspect, a radio access network (RAN) element for supporting security context setup in a wireless communication network is provided. The RAN element comprises an initiating component configured to initiate Access Stratum (AS) security context setup for a first Radio Access Technology (RAT) and a second RAT in a common signaling procedure.

The RAN element may be or comprise at least one of the radio access network element implementing the first RAT and the radio access network element implementing the second RAT.

The RAN element may be configured to perform the method of any of the method steps described herein with respect to the first aspect. The RAN element may comprise or be configured as or be part of a radio base station, a radio network controller (RNC), a nodeB, an eNodeB, a 5G radio unit controller or a 5G base station.

According to a sixth aspect, a core network (CN) element for supporting security context setup in a wireless communication network is provided. The CN element comprises an informing component configured to inform a radio access network (RAN) element of the wireless communication network to initiate Access Stratum (AS) security context setup for a first Radio Access Technology (RAT) and a second RAT in a common signaling procedure.

The CN element may be configured to perform the method of any of the method steps described herein with respect to the second aspect.

According to a seventh aspect, a wireless communication device for supporting security context setup in a wireless communication network is provided. The wireless communication device comprises a receiving component and a setup component.

The receiving component is configured to receive, from a radio access network (RAN) element in a common signaling procedure, information enabling the wireless communication device to set up an Access Stratum (AS) security context for a first Radio Access Technology (RAT) and a second RAT. The setup component is configured to set up the AS security context for the first RAT and the second RAT.

The wireless communication device may be configured to perform the method of any of the method steps described herein with respect to the third aspect. The wireless communication device may comprise or be configured as or be part of a user equipment (UE).

According to an eighth aspect, a wireless communication system is provided. The wireless communication system comprises the RAN element as described herein, the CN element as described herein and one or more wireless communication devices such as user equipments (UEs). The wireless communication system may be configured to perform the steps of any one of the method aspects as described herein.

In general, the steps of any one of the method aspects described herein may equally be performed in one or more suitable components, devices or units, e.g. in suitable components of the RAN element, the CN element, the wireless communication device and/or the wireless communication system.

BRIEF DESCRIPTION OF THE DRAWINGS

In the following, the present disclosure will be further described with reference to exemplary embodiments illustrated in the Figures, in which.

DETAILED DESCRIPTION

Figure 1:
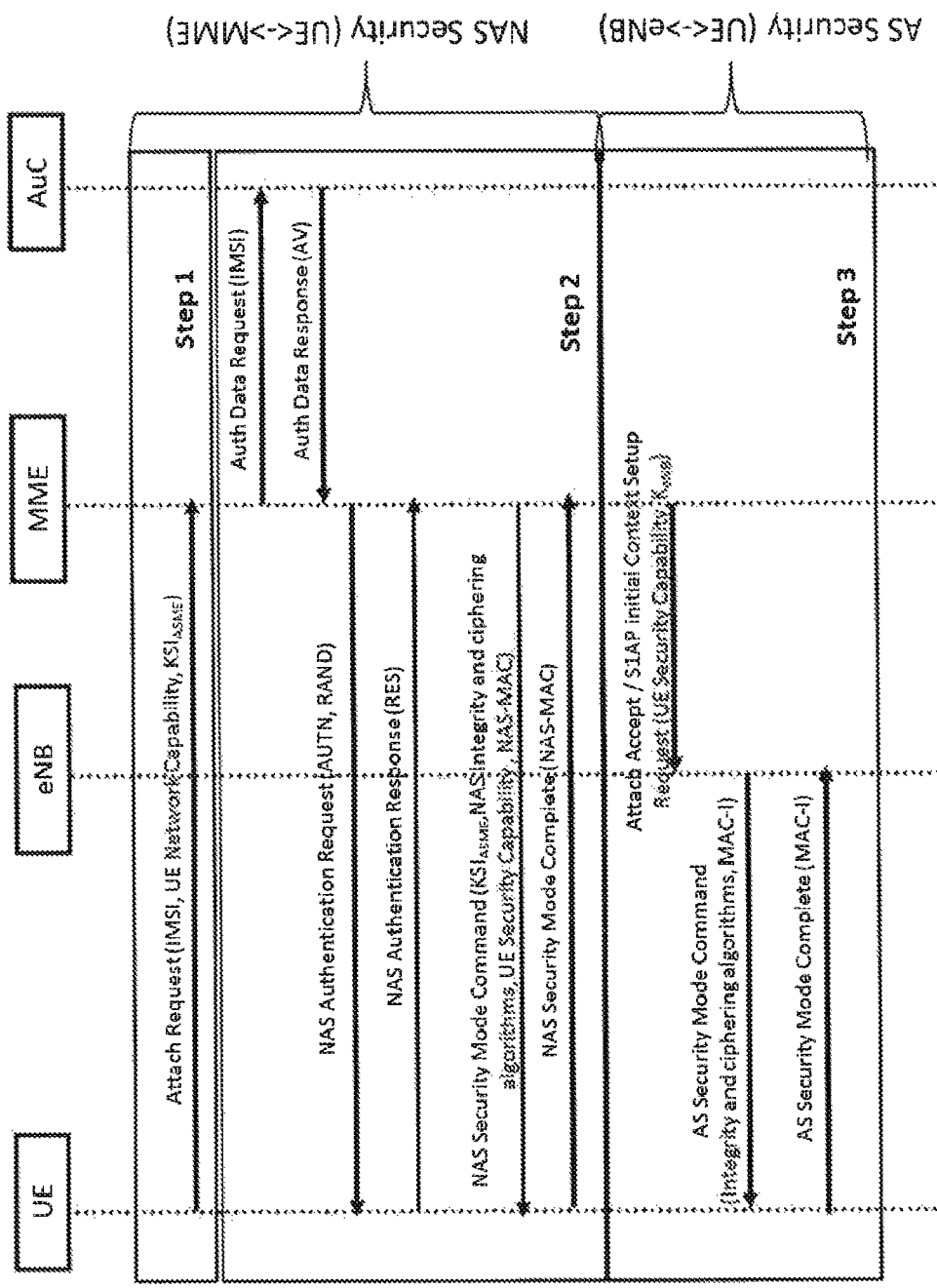
FIG. 1 is a flowchart illustrating signaling steps related to LTE security setup.

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is mainly described with reference to Long Term Evolution (LTE) as a specific example for a technology used in a wireless communication network, the present disclosure may be practiced in any network to which mobile or stationary users using a corresponding user equipment (UE) may attach. For example, the present disclosure is applicable to other cellular networks such as Global System for Mobile Communications (GSM) networks, Universal Mobile Telecommunications System (UMTS) networks, LTE-Advanced (LTE-A) networks, 5G networks, WiFi networks or to Wireless Local Area Network (WLAN) or similar wireless networks and a combination thereof.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to cause the processor to perform the methods disclosed herein when executed by the processor.

Before embodiments are explained in detail below, some general information is given with respect to UE context and security setup.

UE context is a general term to refer to a set of parameters and/or information of a given UE association and/or UE connection towards a given network node. In the case of LTE, for example, there are several types of UE associations needed in the eNB as specified in TS 36.401 V12.2.0 (2015-03). In that case "eNB UE Context" may be used to store all the information needed for a UE in connected state and the associations between the UE and the logical S1 and X2 connections used for S1/X2-AP UE associated messages.

More specifically, the eNB UE context may be understood in the sense of 3GPP TS 36.401 V12.2.0 (2015-03) as a block of information in an eNB associated to one active UE, e.g. in RRC_CONNECTED state. The block of information may contain the necessary information required to maintain the E-UTRAN services towards the active UE. For example, one or more or UE state information, security information (e.g. algorithms, security keys, and parameters), UE capability information (e.g. carrier support, MIMO, transmission format, etc.), UE identities (e.g. C-RNTI, S-TMSI), and the identities of the UE-associated logical S1-connection may be included in the eNB UE context. Establishment of the eNB UE context may be considered completed when the transition to active state for a UE is completed or in target eNB after completion of handover resource allocation during handover preparation, e.g. completion of handover to E-UTRAN. In LTE, when a dedicated connection between the E-UTRAN and the UE does not exist, no UE context information is stored in E-UTRAN. That basically means that the eNB UE context is discarded when the UE moves from RRC_CONNECTED to RRC_IDLE state.

An MME UE context is created when a UE is turned on and attaches to the network. The MME assigns to the UE a unique short temporary identity termed the SAE-Temporary Mobile Subscriber Identity (S-TMSI) which identifies the UE context in the MME. This UE context holds user subscription information downloaded from the Home Subscriber Server (HSS). The local storage of subscription data in the MME allows faster execution of procedures such as bearer establishment since it removes the need to consult the HSS every time. In addition, the UE context also holds dynamic information such as the list of bearers that are established and the terminal capabilities.

To reduce the overhead in the E-UTRAN and the processing in the UE, all UE-related information in the access network can be released during long periods of data inactivity. The UE is then in the ECM-IDLE state. The MME retains the UE context and the information about the established bearers during these idle periods. To allow the network to contact an ECM-IDLE UE, the UE updates the network as to its new location whenever it moves out of its current Tracking Area (TA); this procedure is called a 'Tracking Area Update'. The MME is responsible for keeping track of the user location while the UE is in ECM-IDLE. In that sense one could say that the UE location on a TA level is part of the UE context at the MME.

When there is a need to deliver downlink data to an ECM-IDLE UE, the MME sends a paging message to all the eNBs in its current TA, and the eNBs page the UE over the radio interface. On receipt of a paging message, the UE performs a service request procedure which results in moving the UE to the ECM-CONNECTED state. UE-related information is thereby created in the E-UTRAN, and the bearers are re-established.

The MME is responsible for the re-establishment of the radio bearers and updating the UE context in the eNodeB. This transition between the UE states is called an 'idle-to-active transition'.

The MME is responsible for establishing security for the control signaling between the UE and the core network. When a UE attaches to the network, a mutual authentication of the UE and the network is performed between the UE and the MME/HSS. This authentication function also establishes the security key $K_{ASME}$, which is the basis for all subsequent keys derived for use in the RAN.

The security design of LTE provides compartmentalization. The compartmentalization mainly consists of ensuring that if an attacker breaks the security of one function, only that function is compromised. For example, as explained in threat analysis, there is one key used for encryption of the RRC protocol and another key used for integrity protection of the RRC protocol.

Access Stratum (AS) security is comprised of the integrity protection of control plane (i.e., RRC signalling) and the ciphering of both the control and user planes. The integrity protection algorithm is applied for signalling radio bearers (SRBs) (e.g. two signalling radio bearers SRB1 and SRB2). The ciphering algorithm is applied for the radio bearers (e.g. two signalling radio bearers SRB1 and SRB2 as well as data radio bearers DRBs). On the other hand, neither integrity protection nor ciphering is applied for another signalling radio bearer (e.g. signalling radio bearer SRB0).

If an attacker breaks the Radio Resource Control (RRC) encryption key, the attacker can decrypt and read all RRC messages. However, since the integrity key is different from the encryption key, the attacker cannot modify or inject RRC messages. Neither can an attacker that has broken the RRC encryption key use that to eavesdrop on DRBs since they use separate encryption keys (and vice versa).

Another part of the compartmentalization design is that each eNB uses a separate set of keys. The rationale is that it ensures that an attacker breaking in to one eNB does not gain any information about data transmitted between a UE and another physically different eNB. To maintain the property that breaking into one physical RAN node, i.e., an eNB, does not help in attacking another RAN node, the assisting eNB should use its own key set separate from the key set used in the anchor eNB, however it can be derived from the anchor eNB like in LTE dual connectivity.

To explain further, security keys in LTE can be ordered in a hierarchy where keys on lower levels in the hierarchy are derived from keys at the same or higher levels. The top-level key is K, and it has a permanent value stored in Universal Subscriber Identity Module (USIM) and HSS (authentication center, AuC). From this K, ciphering key (CK) and integrity key (IK) are derived during the authentication procedure running between the UE and HSS/MME. From the CK/IK, the UE and HSS derive a key called $K_{ASME}$. The HSS forwards the $K_{ASME}$ to MME. NAS (between MME and UE) keys ($K_{NAsint}$, $K_{NASenc}$) and $K_{eNB}$ are derived from $K_{ASME}$ at MME. AS (between eNB and UE) security keys ($K_{RRCint}$, $K_{RRCenc}$, $K_{UPenc}$) are derived from $K_{eNB}$, which is forwarded by MME to eNB, at eNB.

Further details of the security design principles are now described with respect to FIG. 1. That is, different steps for the security configuration in EPC are described below and shown in FIG. 1.

In step step1, UE attaches to MME for LTE services. For this purpose, MME receives Attach Request (UE Network Capability indicating supported LTE security algorithms, IMSI) from UE to get the initial access to the network.

In step step2, MME authenticates UE and derive $K_{ASME}$. For this purpose, MME requests for the authentication vector (AV) related to the International Mobile Subscriber Identity (IMSI) by sending the Authentication Data Request to AuC/HSS. After the derivation of random (RAND), expected response (XRES), $K_{ASME}$ (derived from CK, IK and PLMN ID), authentication token (AUTN), AuC combines them as an Authentication Vector (AV=RAND∥XRES∥$K_{ASME}$∥AUTN) and sends it to MME attached within Authentication Data Response.

Then, MME retrieves $K_{ASME}$, random (RAND), expected response (XRES) and AUTN from AV. MME sends AUTN and RAND with Authentication Request to UE. UE authenticates the network by checking AUTN received. Then it derives IK, CK (and $K_{ASME}$ from CK/IK), RES, AUTN and RAND. It sends the response (RES) along with Authentication Response. After receiving RES, MME compares it with XRES and if it matches then authentication is considered successful (else MME sends Authentication Failure to UE). Next, MME derives $K_{NASint}$, $K_{NASenc}$. Input to the key derivations are the particular NAS ciphering and integrity algorithms that are selected by MME based on the UE Network Capability information included in the received Attach Request message. Finally MME sets the downlink NAS counter used for NAS messages protected with the keys derived from this particular $K_{ASME}$ to zero and sends the NAS Security Mode Command (including the $K_{ASME}$ identifier ($KSI_{ASME}$), integrity algorithm, ciphering algorithm, UE Security capability, NAS-MAC) in a non-ciphered message. Here, NAS-MAC (Message Authentication Code for NAS) is generated for integrity protection of the entire message using $K_{NASint}$ and selected integrity algorithm. After receiving NAS Security Mode Command, UE sets $K_{ASME}$ identifier ($KSI_{ASME}$) in the message as its $KSI_{ASME}$ and uses it as an identifier of the current $K_{ASME}$; calculates $K_{ASME}$, $K_{eNB}$, $K_{NASint}$, $K_{NASenc}$; and verifies the integrity of the Security Mode Command message with XNAS-MAC. Next, UE sends MME the NAS Security Mode Complete within an integrity protected message, similarly with a NAS-MAC.

MME derives $K_{eNB}$ from $K_{ASME}$ and sends $K_{eNB}$ to eNB. UE derives $K_{eNB}$ from $K_{ASME}$ so as to calculate other security keys and activate the security.

In step 3, after receiving NAS Security Mode Complete from UE, MME calculates the $K_{eNB}$ and sends it to eNB with S1AP Initial Context Setup Request attaching UE Security Capability and $K_{eNB}$. After receiving $K_{eNB}$, eNB calculates $K_{RRCint}$, $K_{RRCenc}$, $K_{UPenc}$ from that. Then it sends AS Security Mode Command which includes AS integrity and ciphering algorithms as well as MAC-I (Message Authentication Code for Integrity) which is generated by using $K_{RRCint}$. Here, the message is integrity protected but not ciphered, After receiving AS Security Mode Command, UE identifies the security algorithms; calculates $K_{RRCint}$, $K_{RRCenc}$, $K_{UPenc}$; and verifies the integrity of the Security Mode Command message with XMAC-I. Finally, UE will send AS Security Mode Complete to eNB with integrity protection with MAC-I.

It should be noted that after the given steps above, most of the NAS and AS messages will be integrity protected and ciphered except user data which will be only ciphered.

Now RRC configuration for AS security keys will be described. RRC configures all PDCP entities that it is associated with. In particular, RRC configures the PDCP entities with cryptographic keys and configuration data such as which security algorithms to apply. The key set in an eNB consists of the $K_{eNB}$, and $K_{UPenc}$, $K_{RRCenc}$ and $K_{RRCint}$ as discussed above. RRC configures each PDCP entity for user plane traffic (DRB) with an encryption key $K_{UPenc}$ and each PDCP entity for control plane traffic (SRB) with one encryption key $K_{RRCenc}$ and one integrity protection key $K_{RRCint}$. For DRBs used to protect data between a donor-eNB and a relay node, RRC also configures the DRB with an integrity protection key $K_{UPint}$.

AS security activation can be described as follows. The AS Security Mode Command procedure starts the security for radio bearers (RBs) between the eNB and UE. Following this procedure, security is active until the UE or eNB terminates the RRC connection. This implies that when the eNB establishes a new DRB via an RRC reconfiguration procedure, security is already active and the eNB and UE will encrypt the PDCP packets on the DRB from the beginning.

As described above with respect to FIG. 1, the current signaling procedures have not been designed or at least optimized to support a RAN architecture which is comprised of multiple air interfaces where these air interfaces can have some different aspects in their UE context.

One example may comprise security context which is different for different RATs (despite the tight integration) or standard releases or UE capabilities or device categories. For example, there may be different length requirements for the security keys of different RATs or the network termination may be in separate nodes, requiring separate sets of keys.

Signaling bearer establishment and/or data bearer establishment and/or signaling bearer and/or data bearer recovery requires a number of signaling steps as explained above with respect to FIG. 1, resulting in e.g. signaling overhead and/or long signaling duration, especially when the tight integration of multiple air interfaces is assumed. This is even the case when the first RAT and second RAT connections of the UE would be toward the same, or in other words, a shared radio node and/or core network node.

Figure 2:
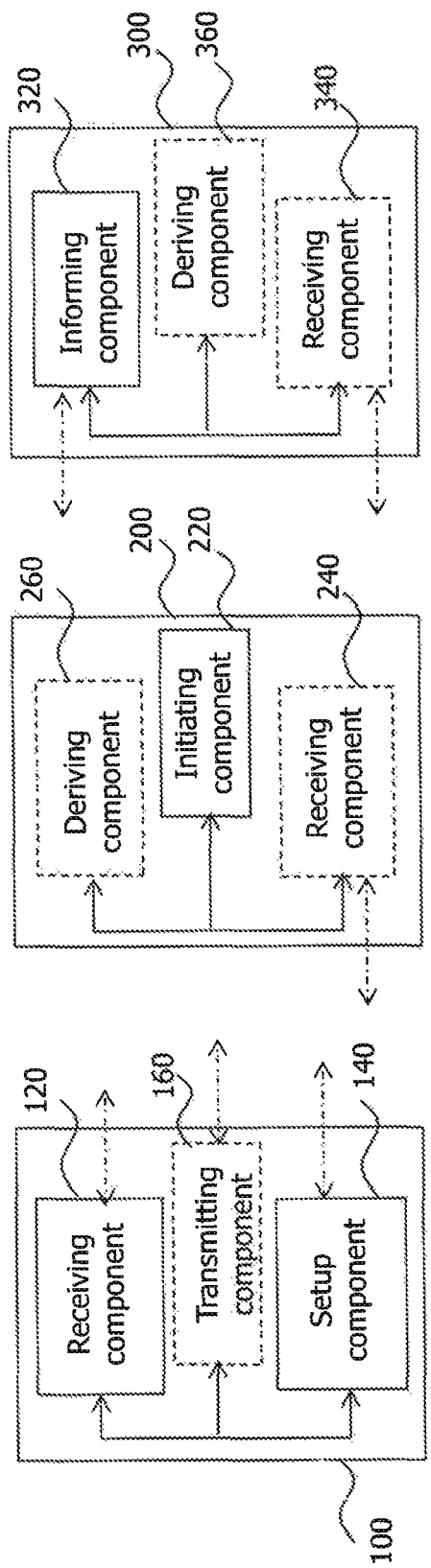
FIG. 2 is a schematic illustration of an embodiment of a system comprising a device embodiment of a wireless communication device, a device embodiment of a radio access network element and a device embodiment of a core network element.

FIG. 2 shows an embodiment of a wireless communication system 20 comprising an embodiment of a wireless communication device 100, an embodiment of a radio access network (RAN) element 200 and an embodiment of a core network (CN) element 300.

The wireless communication device 100 is adapted for supporting security context setup in a wireless communication network. The wireless communication device 100 may be, comprise or be part of a user equipment (UE) operable in accordance with LTE or LTE-A.

The wireless communication device 100 comprises a receiving component 120 and a setup component 140. The wireless communication device 100 may further comprise a transmitting component 160. The receiving component 120 is configured to receive, from a RAN element, e.g. RAN element 200, in a common signaling procedure, information enabling the wireless communication device 100 to set up an Access Stratum (AS) security context for a first Radio Access Technology (RAT) and a second RAT. The setup component 140 is configured to set up the AS security context for the first RAT and the second RAT. The receiving component 120 may be configured to receive further information from a RAN element, e.g. RAN element 200, and/or a CN element, e.g. CN element 300. The transmitting component 160 may be configured to transmit information to a RAN element, e.g. RAN element 200 and/or a CN element, e.g. CN element 300.

The RAN element 200 is adapted for supporting security context setup in a wireless communication network. The RAN element 200 may be, comprise or be part of an eNodeB in case of LTE or LTE-A.

The RAN element 200 comprises an initiating component 220. The RAN element 200 may further comprise a receiving component 240 and/or a deriving component 260. The initiating component 220 is configured to initiate Access Stratum (AS) security context setup for a first Radio Access Technology (RAT) and a second RAT in a common signaling procedure. The receiving component 240 may be configured to receive information from a wireless communication device, e.g. from wireless communication device 100, or a CN element, e.g. CN element 300. The deriving component 260 may be configured to derive certain information from received information, for example.

The CN element 300 is adapted for supporting security context setup in a wireless communication network. The CN element 300 may be, comprise or be part of an Mobility Management Entity (MME) in case of LTE or LTE-A.

The CN element 300 comprises an informing component 320. The CN element 300 may further comprise a receiving component 340 and a deriving component 360. The informing component 320 is configured to inform a RAN element, e.g. RAN element 200, of the wireless communication network to initiate Access Stratum (AS) security context setup for a first Radio Access Technology (RAT) and a second RAT in a common signaling procedure. The receiving component 240 may be configured to receive information from a wireless communication device, e.g. from wireless communication device 100, or a RAN element, e.g. RAN element 200. The deriving component 360 may be configured to derive certain information from received information, for example.

The wireless communication device 100, the RAN element 200 and the CN element 300 will be further described below with respect to FIG. 3.

Figure 3:
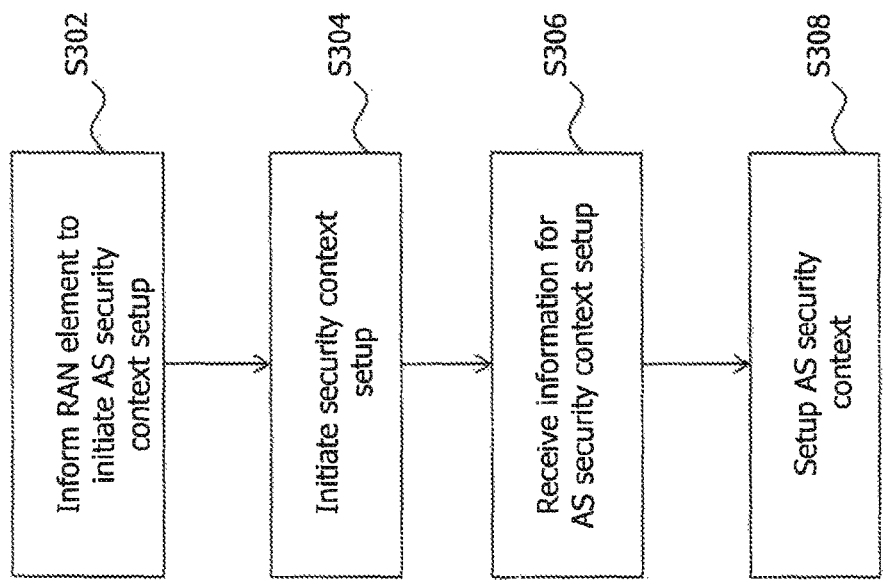
FIG. 3 is a flowchart illustrating a method embodiment performed in the system of FIG. 2.

FIG. 3 shows a method embodiment which can be implemented in the wireless communication system 20 of FIG. 2. In more detail, the first step S302 of FIG. 3 shows a method embodiment which can be implemented in the CN element 300 of FIG. 2, the second step S304 of FIG. 3 shows a method embodiment which can be implemented in the RAN element 200 of FIG. 2 and the third step S306 and the fourth step S308 of FIG. 3 show a method embodiment which can be implemented in the wireless communication device 100 of FIG. 2.

The method of FIG. 3 is supporting security context setup in a wireless communication network, the method comprising informing.

In step S302, the CN element, e.g. CN element 300, of the wireless communication network informs a RAN element, e.g. RAN element 200, of the wireless communication network, to initiate AS security context setup for a first RAT and a second RAT in a common signaling procedure. For example, the informing component 320 of CN element 300 informs in step S302 a RAN element, e.g. RAN element 200, of the wireless communication network, to initiate AS security context setup for a first RAT and a second RAT in a common signaling procedure.

In step S304, the RAN element, e.g. RAN element 200, of the wireless communication network initiates AS security context setup for a first RAT and a second RAT in a common signaling procedure. For example, initiating component 220 of the RAN element 200 initiates, in step S304, AS security context setup for a first RAT and a second RAT in a common signaling procedure.

In step S306, a wireless communication device, e.g. wireless communication device 100, of the wireless communication network receives, from a RAN element, e.g. RAN element 200, of the wireless communication network in a common signaling procedure, information enabling the wireless communication, e.g. wireless communication device 100, to set up an AS security context for a first RAT and a second RAT. For example, receiving component 120 of wireless communication device 100 receives, from a RAN element, e.g. RAN element 200, of the wireless communication network in a common signaling procedure, information enabling the wireless communication, e.g. UE 100, to set up an AS security context for a first RAT and a second RAT in step S306. In step S308, the wireless communication device, e.g. wireless communication device 100, sets up the AS security context for the first RAT and the second RAT. For example, the setup component 140 of wireless communication device 100 sets up the AS security context for the first RAT and the second RAT in step S308.

The present disclosure is described in the following mainly within the context of LTE. It should be understood that the problems and solutions described herein are equally applicable to wireless access networks and user equipments (UEs) implementing other access technologies and standards. Thus, LTE is used as an example technology where the proposed technique is suitable, and using LTE in the following therefore is useful for understanding the technique described herein. Thus, in the following, for sake of explanation rather than limitation, the radio access network element 200 will be referred to as eNB 200 to illustrate, by way of example, that the radio access network element 200 can be configured as a base station and that the technique proposed herein can be used and implemented in LTE. Similarly, the wireless communication device 100 will be referred to as UE 100 to illustrate, by way of example, that the technique proposed herein can be used and implemented in LTE. Similarly, the CN element 300 will be referred to as MME 300 to illustrate, by way of example, that the CN element 300 can be configured as a Mobility Management Entity and that the technique proposed herein can be used and implemented in LTE.

Similarly, context information will be referred to as eNB UE context. The eNB UE context may be understood in the sense of 3GPP TS 36.401 as a block of information in an eNB associated to one active UE. The block of information may contain the necessary information required to maintain the E-UTRAN services towards the active UE. For example, one or more or UE state information, security information, UE capability information and the identities of the UE-associated logical S1-connection may be included in the eNB UE context. Establishment of the eNB UE context may be considered completed when the transition to active state for a UE is completed or in target eNB after completion of handover to E-UTRAN.

Further exemplary details regarding UE 100, eNB 200, MME 300 and the system 20 comprising UE 100, eNB 200 and MME 300, and the methods performed therein are described below with respect to FIGS. 6 to 10. Before these details are explained, some general information about the concept of 5G RAN architecture is briefly explained with reference to FIGS. 4 and 5.

In order to fulfil 5G requirements in terms of data rates and latency a new air interface designed to operate in higher frequencies is needed (e.g. above 6 GHz). In comparison to the current frequency bands allocated to LTE, much more challenging propagation conditions exist so that the coverage of the new air interface can be spottier. The extensive use of beamforming, in particular at the network side, is an essential part of high-frequency wireless access in order to overcome the propagation challenges highlighted earlier. Despite potential link budget gains, reliability of a system purely relying on beamforming and operating in higher frequencies might be challenging (coverage might be more sensitive to time and/or space variations).

In order to support applications requiring very low latencies (in the order of 1 ms), such as some ultra-reliable machine type communication use cases, a new time-domain structure based on shorter transmission time intervals (TTIs)

and a wider bandwidth for radio resource blocks compared to the one specified for LTE are likely to be defined for the new 5G air interface.

In parallel with the 5G research activities, 3GPP is continuously adding new features to LTE and it is likely that at the time 5G reaches the market, LTE should be capable of addressing many of the 5G requirements. In addition to this, LTE is also expected to be heavily deployed and, the fact that it operates in frequency bands with better propagation properties, makes the tight integration of LTE and the new air interface operating in higher frequency bands very appealing.

Regarding 5G RAN architecture, there is currently some ongoing discussion among the different involved parties about architecture alternatives to realize such a tight integration. In some of the discussions, such as in the EU project METIS-II, it is assumed that there are going to be common functionalities in the RAN protocol stack in contrast to the current interworking between the different network accesses. In the current system, differently from that assumption, interworking relies on inter-node interfaces, for both User Plane (UP) and Control Plane (CP). For example, in the case of E-UTRAN and UTRAN interworking, MME and S-GW are inter-connected via S11 interface. Such architecture basically allows coverage continuity and load balancing only via hard handovers (always involving core network signalling) and semi-independent resource management for the multiple air interfaces. Details between the interworking between E-UTRAN and UTRAN can be found in TS 36.300 V13.1.0 (2015-09), for example, or other versions thereof.

Figure 4:
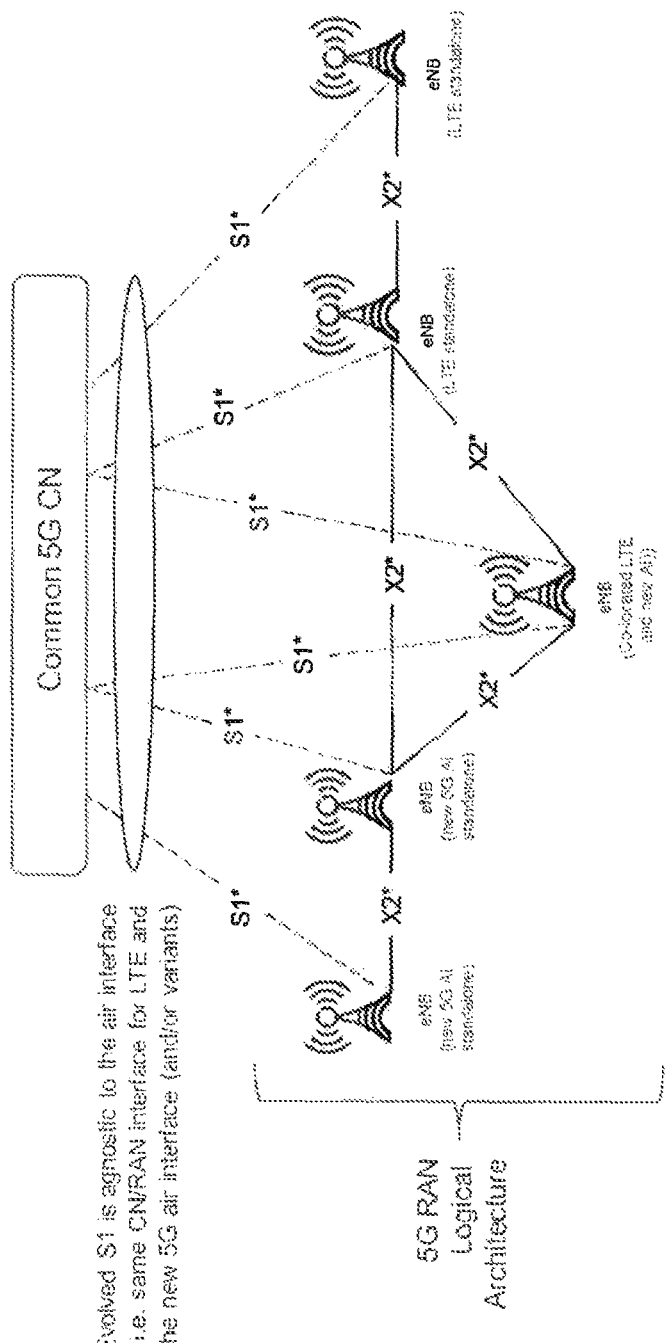
FIG. 4 is a schematic illustration for inter-node interfaces for the 5G RAN.
Figure 5:
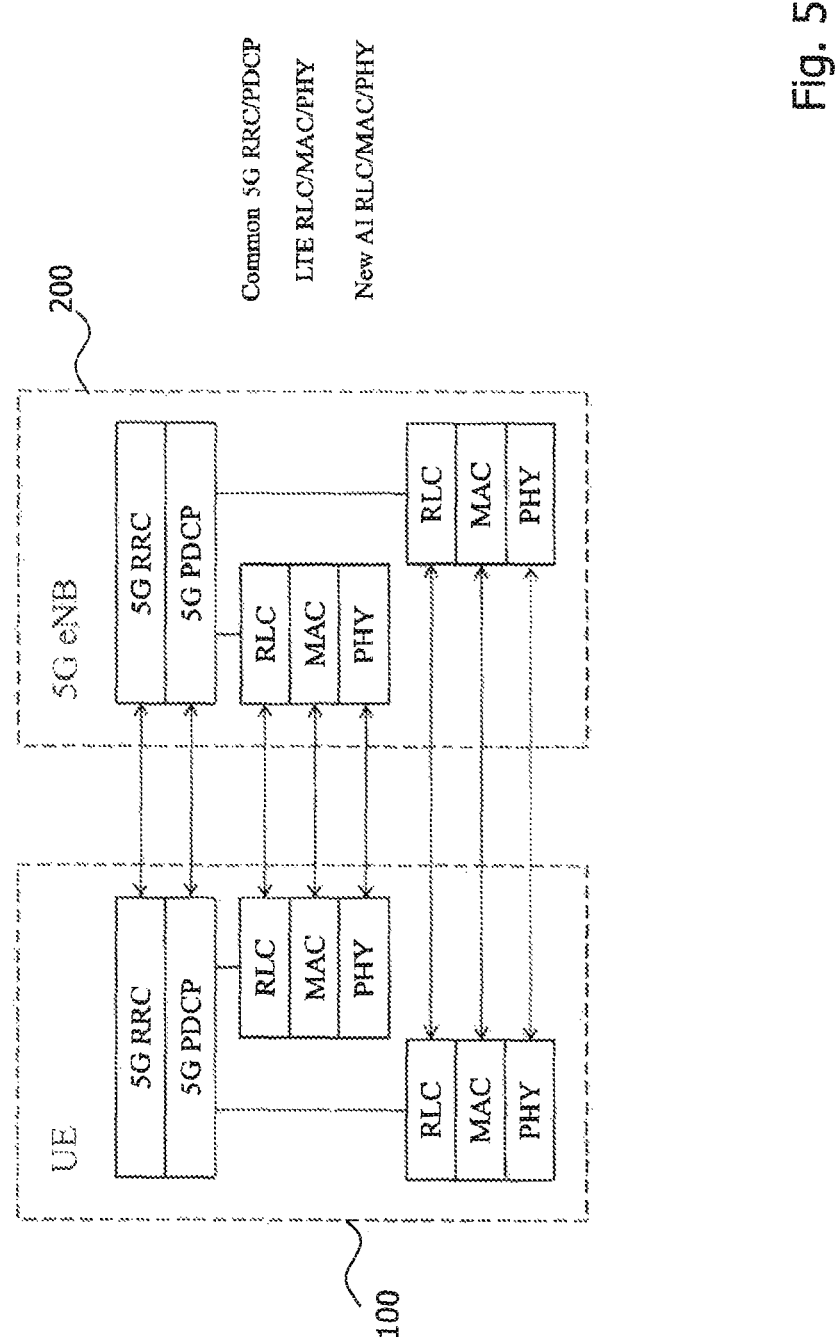
FIG. 5 is a schematic illustration of a protocol architecture for the air interface in the 5G RAN.

In order to realize the tight integration of LTE and the new 5G air interface, it is proposed in (see "Tight integration of new 5G air interface and LTE to fulfill 5G requirements," VTC Spring 2015-1st International Workshop on 5G Architecture, Glasgow, Scotland) a logical architecture relying on common RRC/PDCP protocol layers, as shown in FIG. 5. "AI" denotes air interface, which is in the following sometimes referred to as NX, 5G NX or, in short, 5G A possible embodiment for common inter-node interfaces is shown in FIG. 4.

Figure 6:
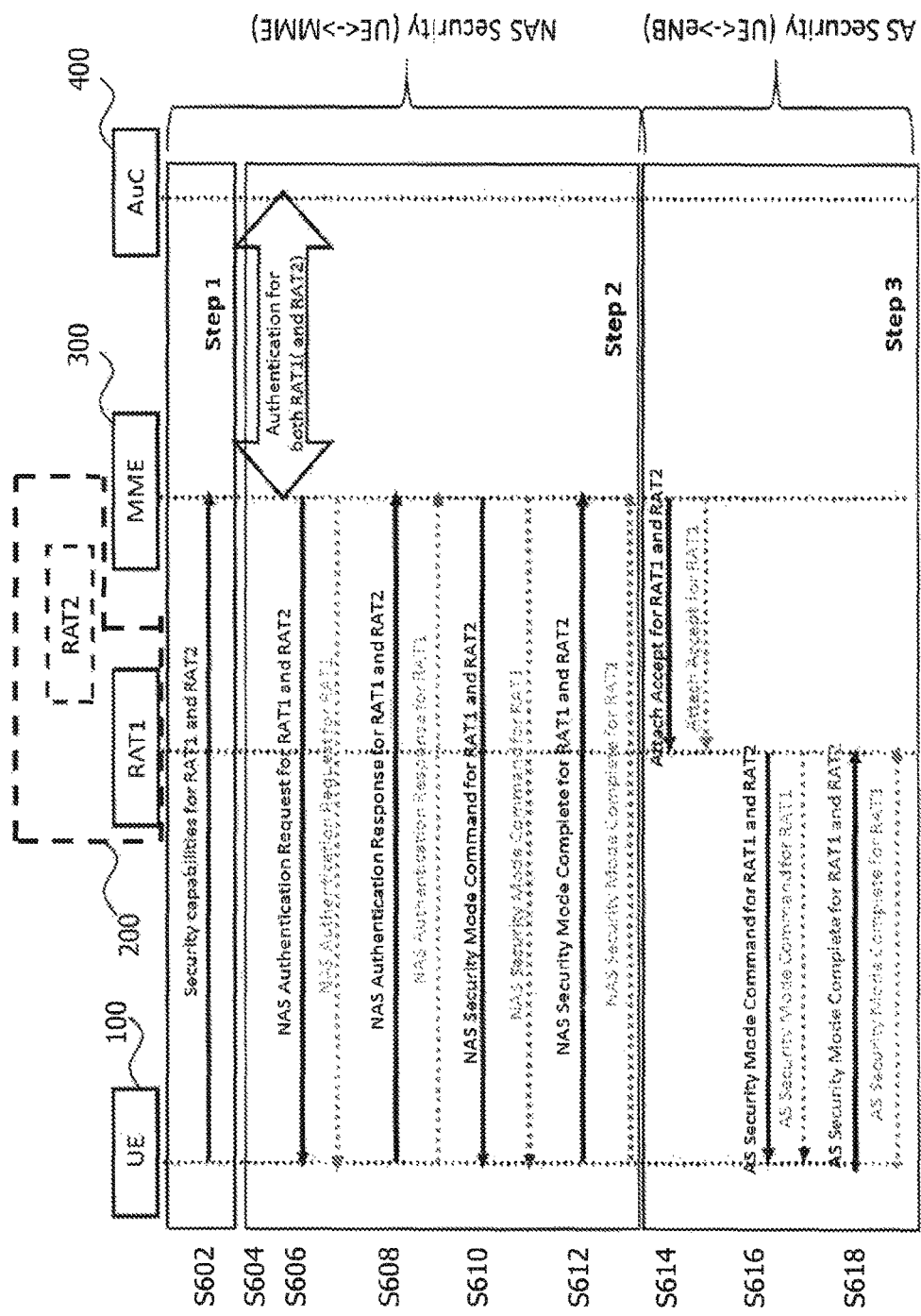
FIG. 6 a flowchart illustrating a Combined attach procedure via a single RAT that can be performed in the system of FIG. 2.

Further details of the embodiments of FIGS. 2 and 3 are now explained in FIG. 6. In more detail, as illustrated in FIG. 6, the following may be performed by UE 100 and/or eNB 200 and/or MME 300. For illustration rather than limitation, a first RAT (RAT1) and a second RAT (RAT2) are supported by the same eNB, i.e. eNB 200, in FIG. 6. However, this is not to be understood as limiting. Rather, RAT1 and RAT2 may be supported by different eNBs, e.g. RAT1 by eNB 200 and RAT2 by a different eNB. Thus, the present disclosure is equally applicable independent of whether one BS implements both RATs or whether the two RATS are implemented separately in different BSs. It is assumed that there is only one RAN-CN connection per UE for both RATs. The first RAT and second RAT can be combined in one BS or can be distributed to two separate BSs. In case of separate BS for the first and second RATs, the BS of the first RAT is informed by the BS of the second RAT about security capabilities of the BS for the second RAT prior to the below method. Further, as mentioned above, in case of separate BS for the first and second RAT, the BS of the second RAT does not need a connection to the CN.

It is explained in the following how to handle the UE context for security via a common procedure (assuming a scenario with a tight integration of multiple air interfaces such as LTE and another RAT) so as to enable fast, efficient and secure connection establishment for multi-RATs (e.g., 4G and 5G) regardless of which access technology being used initially (e.g., for Attach procedure). Here, 5G may refer to the LTE evolution, or another RAT which can be assumed as 5G.

The security context may include security capabilities, keys, algorithms, and parameters available. For some procedures, a subset of multi-RAT security context (e.g., security keys, parameters or algorithms) may be identical (for different RATS) minimizing the context overhead and amount of processing. However, this may not always be the case even if the related procedures are the same or similar for different RATs. For instance, if the RATS are not co-located in a secure physical node, context transformation may be needed in order not to break the compartmentalization principle mentioned in the background section even if the same type key material and related procedures can be reused.

In accordance therewith, UE 100 could attach for "LTE only" or "5G only" or for "combined LTE and 5G". In case of a 5G and LTE combined attach (e.g., via 5G RAT), the method comprised herein includes one or more of the steps as explained in the following with respect to FIG. 6.

With respect to FIG. 6, in a first step step1, UE 100 attaches to CN for both 5G and LTE services. For this purpose, UE 100 sends CN 300 (referring to a logical CN function and/or CN network element handling attach requests e.g. MME 300) its context information on the security capabilities for both RAT1 and RAT2 (e.g., supported security algorithms via UE Network Capability information available in Attach Request) when it attaches over RAT1 (e.g., in the Attach message) (step S602). Accordingly, UE 100 is indicated as an LTE+5G UE within the Attach Request. In other words, UE 100 informs CN 300 (in the following, it will sometimes be referred to MME 300 generally as CN element or in short just CN 300) about its security capabilities regarding the first RAT and the second RAT when sending an initial L3 message to the CN 300 (e.g. ATTACH REQUEST for the purpose for CN attachment; Tracking Area Update (TAU) Request for informing the CN about an IDLE mode mobility event via the first RAT).

As stated above, UE 100 can include an indicator for LTE as well as for 5G services. Therefore CN 300 can trigger RAN element 200 to combined activation as described herein. To complete the security setup description, UE 100 can include its LTE security capabilities. These are the supported encryption and integrity algorithms for different access types. The indication of attach type could be implicit from which capabilities the UE includes in the Attach message. In general, it may be beneficial to keep the UE security capabilities for all the RATs that the UE supports in the CN for future inter-RAT handovers.

After informing the CN 300 about the UE 100 security capabilities, security set up for NAS (UE-CN for signaling) is performed in step step2. For this purpose, CN 300 requests authentication of UE 100 in a NAS authentication request message (step S606) and derives CN key material (common for both RATs or separate for each RAT). The UE verifies the authenticity of the authentication request and replies with an authentication response message (step S608) and derives the corresponding CN key material. In other words, CN 300 authenticates UE 100 for both 5G and LTE services and derives a CN-level key (e.g., $K_{ASME}$). In more detail, CN 300, e.g. MME 300, requests for the authentication vector (AV) related to the International Mobile Subscriber Identity (IMSI) by sending the Authentication Data Request to AuC/HSS 400 (step S604). Here, the AV could be a dual vector related to both 5G and LTE. Also, AuC 400 recognizes UE 100 is a dual RAT UE 100. CN retrieves security keys and parameters from dual AV related to both 5G and LTE. CN 300 sends the Authentication Request, which is valid for both 5G and LTE, to UE 100 in step S606. UE 100 authenticates the CN 300 by checking the received security parameters, deriving the security keys and other parameters. The derivation is done for both NX and LTE. This way, UE 100 will run a common or separate authentication algorithm(s) at the same time and prepare a single message (e.g., Authentication Response) in step S608.

When UE 100 sends the authentication response message, and when CN 300 receives the authentication response message, the UE 100 and the CN 300 consider the authentication completed for both RATs. CN 300 derives further CN key material for integrity protection and ciphering of NAS communication and sends information enabling UE 100 to derive the further CN key material to UE 100 in a NAS security mode command message (step S610). This information may correspond to some information from which the CN key material, a RAN key material or both can be derived. The message may comprise an indication that the CN and/or RAN key material is for the first RAT, the second RAT or for both. UE 100 derives the further CN and RAN key material and replies to CN 300 in a NAS security mode command complete message (step S612) to confirm to CN 300 that the procedure is successfully completed in UE 100. In this respect, deriving a key material does not necessarily need to be performed immediately but is typically derived when it should be used the first time (an encryption key does not need to be calculated by the sender until the first message is encrypted).

To explain further, CN 300 verifies the authentication for both 5G and LTE and derives keys and further parameters based on the selected security algorithms, which could be either common or separate to both RATs. Next, CN 300 sends the NAS security command in step S610, with relevant security parameters, capabilities and integrity protection, for both LTE and 5G. After receiving NAS Security Mode Command, which is valid for both RATs, UE 100 can derive further security keys and parameters; and verify the integrity of the Security Mode Command message. Next, UE 100 sends CN 300 the NAS Security Mode Complete with relevant security parameters, capabilities and integrity protection, for both LTE and 5G in step S612.

After the CN key material is derived, security set up for AS (UE-RAN for signaling and user plane) is performed in step step3. For this purpose, CN 300 derives from the CN key material the RAN key material (common for both RATs or separate for each RAT) and sends, in step S614, the RAN key material to RAN element 200 (also sometimes referred to as eNB 200 in the following), e.g. in a S1AP UE Initial Context Setup message (on NAS level). If eNB 200 has not received the RAN key material for the second RAT, eNB 200 derives this RAN key material from the RAN key material for the first RAT. Then, eNB 200 sends to UE 100 information enabling UE 100 to derive the RAN key material and activating AS security for both RATs, e. g. in an AS Security Mode Command message (step S616). UE 100 derives this RAN key material and informs eNB 200 of the first RAT or the eNB 200 of the second RAT (e.g. piggy-backed in RRC message) in an AS security mode complete message thereof. In case the message is sent to a base station of the second RAT, the base station of the second RAT sends an X2AP indication to the base station of the first RAT. This indication indicates to the base station of the first RAT that the security is established for both RATs.

To explain further, CN 300 derives a common (e.g., $K_{eNB}$) or separate RAN-level key material for both 5G and LTE securities from a common (e.g., $K_{ASME}$) or separate CN-level key material, and sends the derived RAN-level key material to RAN element 200 (step S614). UE 100 also derives the same RAN-level key material (e.g., $K_{eNB}$ from $K_{ASME}$) so as to calculate other security keys and activate the end-to-end security for both 5G and LTE services. After receiving NAS Security Mode Complete from UE 100 in step S612, CN sends RAN-level key material (e.g., a common $K_{eNB}$) for both LTE and 5G to RAN element 200 in step S614 with S1AP Initial Context Setup Request attaching UE Security Capability and LTE and 5G keys or a common RAN-level key material for both LTE and 5G. In this way, dual security context is given to RAN element 200 by CN 300. After receiving RAN-level key material, RAN element does the integrity check and calculates the required AS keys and parameters for both LTE and 5G from that. Then it sends a common AS Security Mode Command in step S616 with the required security parameters for both LTE and 5G with integrity protection. In this way, a combined activation is enabled. After receiving AS Security Mode Command, UE 100 identifies the security algorithms and calculates the AS security keys for both LTE and 5G; and verifies the integrity of the Security Mode Command message. Finally, UE 100 sends a common AS Security Mode Complete to RAN element with integrity protection in step S618.

RAN element 200 derives an NX key from $K_{eNB}$ and uses the 5G key as a basis for any encryption and integrity key that should be used on 5G. Some variations on the steps given above may be possible. For instance, instead of the case where MME 300 derives a 5G and LTE keys or a common $K_{eNB}$ (e.g., from the common $K_{ASME}$) directly and gives that to the RAN element 200, RAN element 200 can also derive a 5G key from $K_{eNB}$ and can use the 5G key as a basis for any encryption and integrity key that should be used on 5G. This may be mandated especially when the 5G and LTE RATs are not co-located (due to compartmentalization principle).

Note that sending information from which the RAN key can be derived from the CN element 300 to UE 100 is one option. Another option is sending such information from RAN element 200 to UE 100. It is also possible that both pieces of information are sent and the RAN key is derived from them both.

As stated above, the CN may need to explicitly indicate to the RAN what to do if some steps are considered transparent to the RAN e.g., especially when common key material, algorithms are used for setting up multiple RAT securities. Similarly, UE 100 may need to explicitly be acknowledged on which RAT securities to be activated e.g., via Security Mode Command. The decision for the AS security context to be created and activated can be made on the RAN or CN level. Despite the indication of dual RAT security capabilities of UE 100, RAN element 200 or CN 300 may reject the security setup for a specific RAT. In this case MME 300 or eNB 200 can implicitly acknowledge the rejection of a security setup (e.g., RAT2 security) by responding only for one RAT (e.g., RAT1 security) as shown in FIG. 6. Alternatively, any reject or failure message can be signalled within a dedicated signalling procedure.

In a variation of FIG. 6, even though MME 300 can successfully authenticate UE 100 for both RATs and create the required context, the security activation for a certain RAT and security (e.g., AS security for RAT2) can be postponed. This is could be e.g., due to mobility, traffic load, security policy or any other reason.

As explained herein, multi-RAT context for security is handled via a common procedure so as to enable fast, efficient and secure connection establishment for multi-RATs. In accordance therewith, UE can request multi-RAT security setup and the network (NW) can run a single procedure (e.g., Security Mode Command) to activate security for both LTE and 5G. To be able to do that, the NW may need to get the required information from another network element related to both LTE and 5G for this UE.

Herein, a mechanism for simultaneous signaling related to set up security between a UE and a network for two or more RATs, e.g, LTE, 5G, is described. Activation of the security might or might not be done simultaneously for both RANs. Security is activated for two strata. The first is between the UE and a CN node, and the second is between the UE and a RAN node. The mechanism comprises mutual authentication between the UE and CN by means of a first single NAS procedure. Further, a second CN node informs the UE whether security shall be activated for two or more RATs simultaneously in a single procedure for the first NAS stratum. The first and second CN node can be the same. The informing may also indicate whether the security shall be activated for the second stratum (the AS for two or more RATs). If the informing did not apply to the AS, a RAN node activates security for AS using an AS procedure.

Without the procedure described herein, there may be security setup between the UE and the CN for each UE to CN connection, and for LTE there may in addition be a separate AS security setup. For example, for LTE and 3G two separate procedures corresponding to signaling of steps step2 and step3 in FIG. 6 would have to be run. In a scenario where the UE is connected to one 3GPP RAT and is then handed over to a second RAT, the UE and CN nodes first has to run signaling to establish security for the first RAT, and then during the handover they need to further perform signaling to establish security for the second RAT. In a scenario where a UE performs a handover from LTE to 3G, the UE does not perform a security establishment for 3G but trust the same security parameters used in LTE. In other words, there is no security set-up for 3G.

By way of the procedure described herein, a security context set-up for a UE capable of employing two RATs can be handled for the two RATs at the same time in one single procedure per stratum to reduce signaling overhead. Further, the security context set-up can include authentication procedure, NAS (CN-UE) activation procedure and AS activation procedure (RAN-UE), wherein each procedure may use a common procedure for both RATs. Further, single AS security mode command request from BS to UE for both RATs may activate in UE security for two RATs. Still further, a single NAS security mode command request from CN to UE for both RATs may activate in UE security for the CN key for the two RATs, and possibly informs the UE about whether the AS security mode command should apply to one or both of the RATs.

Herein, methods are described to handle UE security context via a common procedure assuming a scenario with a tight integration of multiple air interfaces (such as LTE and 5G). The method may be summarized as follows:
1. UE attaches to CN for both 5G and LTE services.
2. CN authenticates UE for both 5G and LTE services and derives a CN-level key (e.g., $K_{ASME}$).
3. a. CN derives a common (e.g., $K_{eNB}$) or separate RAN-level key material for both 5G and LTE from a common (e.g., $K_{ASME}$) or separate CN-level key material; and sends the derived RAN-level key material to RAN element. UE also similarly derives the same key material (e.g., $K_{eNB}$ from $K_{ASME}$) so as to calculate other security keys and activate the end-to-end security for both NX/5G and LTE services.
   b. RAN element derives an NX/5G key from $K_{eNB}$ and uses the 5G key as a basis for any encryption and integrity key that should be used on 5G.

Here, CN refers to a logical CN function and/or CN network element e.g., that handles Attach Requests, and RAN element denotes a RAN node or logical function where the multi-RAT connection (like a common RRC entity) is terminated at the network side.

As a consequence, signaling for the second RAT security is reduced, e.g. to a minimum. Compartmentalization of the RAN key material on the same security level as LTE Dual Connectivity can be ensured. That is, an attacker that obtains the key material for the second RAT will not have access to the key material for the first RAT, but an attacker obtaining the key material for the first RAT will be able to derive the key material for the second RAT.

By way of the technique described herein, a more efficient way of handling security context for multiple RATs and related security procedures is provided. In consequence, the signaling overhead and the energy consumption thereof may be reduced. Signaling reduction occurs when the UE sets up a dual or multi connectivity among the dual or multiple RATs, respectively, so that security context of the second RAT is already prepared. Security parameters for the second RAT can be provided piggy-backed on the security procedures applied for the first RAT.

Creating the security context in advance for dual/multiple RATs also means that the user plane can be enabled faster while switching from one RAT to the other.

Figure 7:
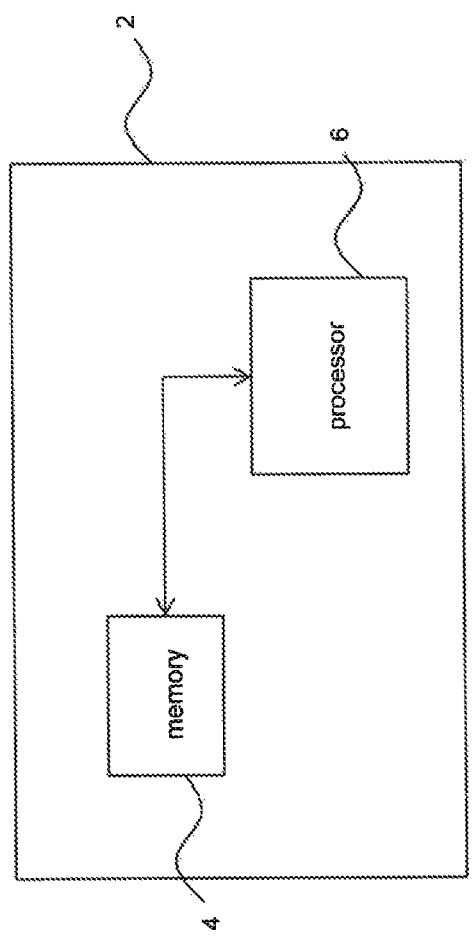
FIG. 7 is a block diagram schematically illustrating an embodiment of a radio access network element or a wireless communication device or a core network element.

The details explained above with respect to FIGS. 2 to 6 may be summarized with respect to FIG. 7. FIG. 7 is a block diagram schematically illustrating a device embodiment of a network element 2 supporting security context setup in a wireless communication network.

By way of example, the network element 2 is described to implement the functionalities of the radio access network element 200 according to the embodiment of FIG. 2. The radio access network element 2 comprises a memory 4 and a processor 6 coupled to one another. The radio access network element may further comprise an optional interface coupled to the processor 6. The memory 4 contains control instructions executable by the processor 6.

The processor 6 is configured to initiate Access Stratum (AS) security context setup for a first Radio Access Technology (RAT) and a second RAT in a common signaling procedure. The interface may be configured to carry out any communication with other components of the communication network. For example, the interface may transmit information to other components of the communication network and/or may receive information from other components of the communication network.

Alternatively, the network element 2 is described to implement the functionalities of the core network element 300 according to the embodiment of FIG. 2. The radio access network element 2 comprises a memory 4 and a processor 6 coupled to one another. The radio access network element may further comprise an optional interface coupled to the processor 6. The memory 4 contains control instructions executable by the processor 6. The processor 6 is configured to inform a radio access network (RAN) element of the wireless communication network, to initiate Access Stratum (AS) security context setup for a first Radio Access Technology (RAT) and a second RAT in a common signaling procedure. The interface may be configured to carry out any communication with other components of the communication network. For example, the interface may transmit information to other components of the communication network and/or may receive information from other components of the communication network.

Alternatively, the network element 2 is described to implement the functionalities of the wireless communication device 100 according to the embodiment of FIG. 1. The radio access network element 2 comprises a memory 4 and a processor 6 coupled to one another. The radio access network element may further comprise an optional interface coupled to the processor 6. The memory 4 contains control instructions executable by the processor 6. The processor 6 is configured to receive, from a radio access network (RAN) element of the wireless communication network in a common signaling procedure, information enabling the wireless communication to set up an Access Stratum (AS) security context for a first Radio Access Technology (RAT) and a second RAT. The processor is further configured to set up the AS security context for the first RAT and the second RAT.

Figure 8:
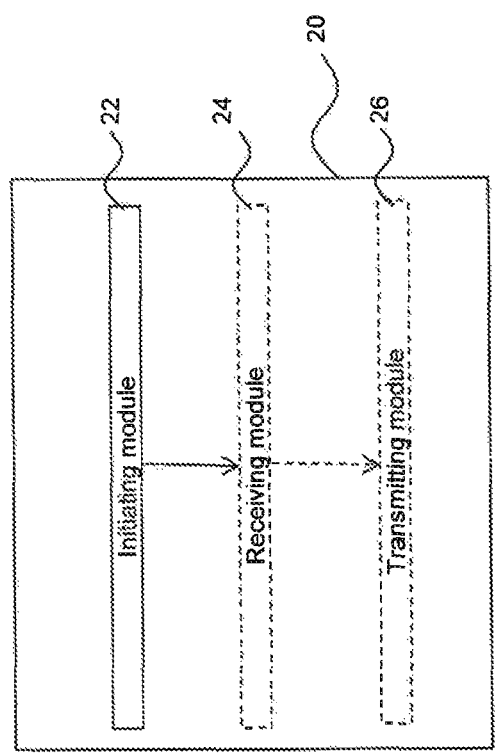
FIG. 8 is a block diagram schematically illustrating a further embodiment of a radio access network element.

FIG. 8 shows a functional block diagram of a radio access network element 20 configured in accordance with the principles of the disclosure as described above. The functional blocks of the network element 20 may be implemented by hardware, software, or a combination of hardware and software to carry out the principles of the disclosure. It is understood by a person skilled in the art that the functional blocks described in FIG. 8 may be combined in one or more blocks or separated into sub-blocks to implement the principles of the disclosure as described above.

Therefore, the description herein may support any possible combination or separation or further definition of the functional blocks described herein.

The radio access network element 20 of FIG. 8 is for supporting security context setup in a wireless communication network. The network element 20 comprises an initiating module 22 for initiating Access Stratum (AS) security context setup for a first Radio Access Technology (RAT) and a second RAT in a common signaling procedure.

The network element 20 may comprise a receiving module 24. The receiving module is for receiving, by the RAN element, first RAN key material from a core network (CN) element of the wireless communication network. The first RAN key material enables the RAN element to initiate the AS security context setup for the first RAT. The receiving module is further for receiving, by the RAN element, second RAN key material from the CN element of the wireless communication network. The second RAN key material enables the RAN element to initiate the AS security context setup for the second RAT.

The receiving module may be for receiving, by the RAN element, first RAN key material from a CN element of the wireless communication network. The first RAN key material enables the RAN element to initiate the AS security context setup for the first RAT. The network element 20 may further comprise a deriving module for deriving, by the RAN element, second RAN key material from the received first RAN key material. The second RAN key material enables the RAN element to initiate the AS security context setup for the second RAT.

The network element 20 may further comprise a transmitting module 26 for transmitting, by the RAN element, a common AS security mode command message for the first RAT and the second RAT to a wireless communication device of the wireless communication network.

The receiving module may further be for receiving, by the RAN element, an AS security mode complete message informing the RAN element of the completion of the AS security context setup for the first RAT and the second RAT.

The network element 20 may correspond to the RAN element implementing the first RAT and may correspond to or be different from the RAN element implementing the second RAT.

Figure 9:
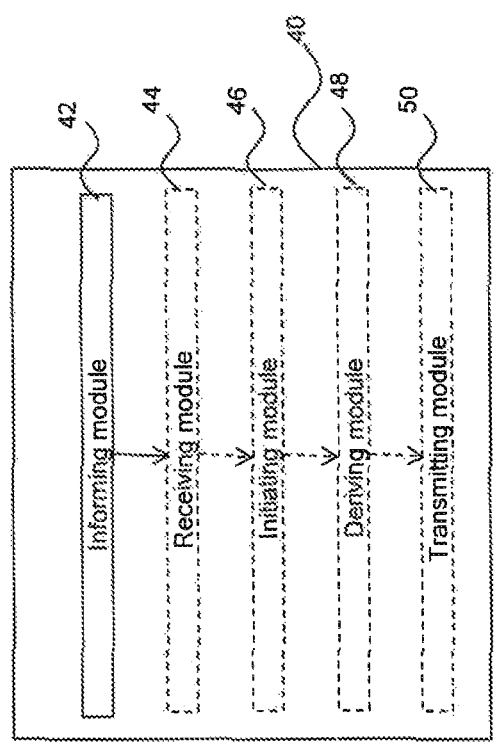
FIG. 9 is a block diagram schematically illustrating a further embodiment of a core network element.

FIG. 9 shows a functional block diagram of a core network element 40 configured in accordance with the principles of the disclosure as described above. The functional blocks of the network element 40 may be implemented by hardware, software, or a combination of hardware and software to carry out the principles of the disclosure. It is understood by a person skilled in the art that the functional blocks described in FIG. 9 may be combined in one or more blocks or separated into sub-blocks to implement the principles of the disclosure as described above. Therefore, the description herein may support any possible combination or separation or further definition of the functional blocks described herein.

The core network element 40 of FIG. 9 is supporting security context setup in a wireless communication network. The core network element 40 comprises an informing module 42 for informing a radio access network (RAN) element of the wireless communication network, to initiate Access Stratum (AS) security context setup for a first Radio Access Technology (RAT) and a second RAT in a common signaling procedure The core network element 40 may comprise a receiving module 44 for receiving, by the CN element from a wireless communication device, information about security capabilities of the wireless communication device regarding the first RAT and the second RAT.

The core network element 40 may comprise an initiating module 46 for initiating, by the CN element, Non Access Stratum (NAS) security context setup for the first RAT and the second RAT in a common signaling procedure.

The initiating module may further be for initiating the NAS security context setup comprises requesting, by the CN element, a wireless communication device to perform authentication towards the CN element.

The core network element 40 may comprise a deriving module 48 for deriving, by the CN element, CN key material enabling a wireless communication device to perform authentication for the first RAT and enabling the wireless communication device to perform authentication for the second RAT.

The core network element 40 may comprise a transmitting module 50 for transmitting, by the CN element, the CN key material to the wireless communication device.

The receiving module may further be for receiving, by the CN element, an authentication response message from the wireless communication device.

The deriving module may further be for deriving, by the CN element, CN key material for integrity protection and ciphering of NAS communication.

The transmitting module may further be for transmitting, by the CN element, an NAS security mode command message for the first RAT and the second RAT to the wireless communication device, the NAS security mode command message enabling the wireless communication device to derive the CN key material for integrity protection and ciphering of NAS communication.

The receiving module may further be for receiving, by the CN element, an NAS security mode complete message for the first RAT and the second RAT from the wireless communication device.

Figure 10:
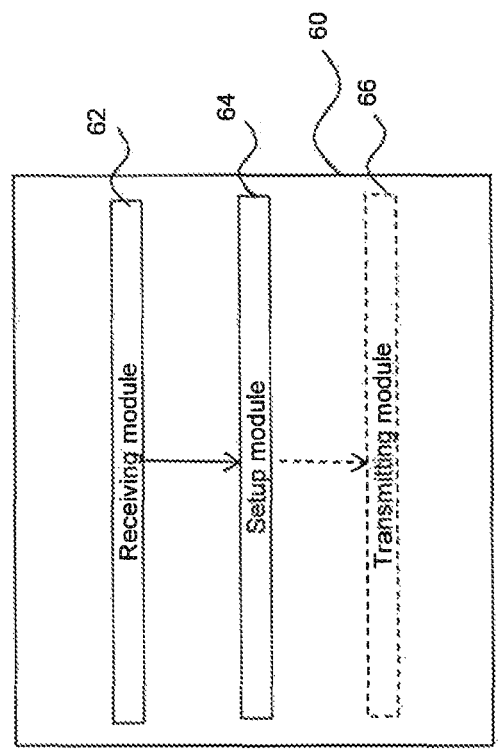
FIG. 10 is a block diagram schematically illustrating a further embodiment of a wireless communication device.

FIG. 10 shows a functional block diagram of a wireless communication device 60 configured in accordance with the principles of the disclosure as described above. The functional blocks of the wireless communication device 6 may be implemented by hardware, software, or a combination of hardware and software to carry out the principles of the disclosure. It is understood by a person skilled in the art that the functional blocks described in FIG. 10 may be combined in one or more blocks or separated into sub-blocks to implement the principles of the disclosure as described above. Therefore, the description herein may support any possible combination or separation or further definition of the functional blocks described herein.

The wireless communication device 60 of FIG. 10 is supporting security context setup in a wireless communication network. The wireless communication device 60 comprises a receiving module 62 for receiving, from a radio access network (RAN) element of the wireless communication network in a common signaling procedure, information enabling the wireless communication to set up an Access Stratum (AS) security context for a first Radio Access Technology (RAT) and a second RAT. The wireless communication device 60 further comprises a setup module 64 for setting up the AS security context for the first RAT and the second RAT.

The receiving module may further be for receiving, by the wireless communication device from the RAN element of the wireless communication network, a common AS security mode command message for the first RAT and the second RAT.

The wireless communication device 60 may further comprise a transmitting module 66 for transmitting, by the wireless communication device, an AS security mode complete message to the RAN element, the AS security mode complete message informing the RAN element of the completion of the AS security context setup for the first RAT and the second RAT.

The transmitting module may further be for transmitting, by the wireless communication device to a core network, CN, element of the wireless communication network, information about security capabilities of the wireless communication device regarding the first RAT and the second RAT.

The receiving module may further be for receiving, by the wireless communication device from a CN element, a request to perform authentication towards the CN element.

The transmitting module may further be for transmitting, by the wireless communication device, an authentication response message to the CN element.

The receiving module may further be for receiving, by the wireless communication device, an NAS security mode command message for the first RAT and the second RAT from the CN element and deriving, by the wireless communication device, CN key material for integrity protection and ciphering of NAS communication for the first RAT and the second RAT from the received NAS security mode command message.

The transmitting module may further be for transmitting, by the wireless communication device, an NAS security mode complete message for the first RAT and the second RAT to the CN element.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting security context setup in a wireless communication network, the method comprising:
   establishing a first connection between a wireless communication device and a first communication network using a first Radio Access Technology (RAT);
   establishing a second connection between the wireless communication device and a second communication network using a second RAT, wherein the second RAT is different than the first RAT; and
   initiating, by a radio access network (RAN) element of the wireless communication network, Access Stratum (AS) security context setup for the first RAT and the second RAT in a single common signaling procedure.

2. The method of claim 1, further comprising
   receiving, by the RAN element, first RAN key material from a core network (CN) element of the wireless communication network, the first RAN key material enabling the RAN element to initiate the AS security context setup for the first RAT; and
   receiving, by the RAN element, second RAN key material from the CN element of the wireless communication network, the second RAN key material enabling the RAN element to initiate the AS security context setup for the second RAT.

3. The method of claim 1, further comprising
   receiving, by the RAN element, first RAN key material from a core network (CN) element of the wireless communication network, the first RAN key material enabling the RAN element to initiate the AS security context setup for the first RAT; and
   deriving, by the RAN element, second RAN key material from the received first RAN key material, the second RAN key material enabling the RAN element to initiate the AS security context setup for the second RAT.

4. The method of claim 2, wherein the initiating the AS security context setup comprises:
   directly using the received first RAN key material for initiating the AS security context setup for the first RAT; or
   deriving third RAN key material from the received first RAN key material and using the derived third RAN key material for initiating the AS security context setup for the first RAT.

5. The method of claim 1, wherein the initiating the AS security context setup comprises transmitting, by the RAN element, a common AS security mode command message for the first RAT and the second RAT to a wireless communication device of the wireless communication network.

6. A method of supporting security context setup in a wireless communication network, the method comprising:
   receiving, at a core network (CN) element of the wireless communication network, and from a wireless communication device having respective first and second established connections with a first Radio Access Technology (RAT) and a second RAT, security capabilities for the wireless communication device for both the first and second RATs, wherein the second RAT is different than the first RAT; and
   informing, by the CN element of the wireless communication network, a radio access network (RAN) element of the wireless communication network, to initiate Access Stratum (AS) security context setup for the first and second RATs in a single common signaling procedure.

7. The method of claim 6, further comprising initiating, by the CN element, Non Access Stratum (NAS) security context setup for the first RAT and the second RAT in the single common signaling procedure.

8. The method of claim 7, wherein the initiating the NAS security context setup comprises requesting, by the CN element, the wireless communication device to perform authentication towards the CN element.

9. The method of claim 7, further comprising deriving, by the CN element, CN key material enabling the wireless communication device to perform authentication for the first RAT and enabling the wireless communication device to perform authentication for the second RAT.

10. The method of claim 9, further comprising transmitting, by the CN element, the CN key material to the wireless communication device.

11. The method of claim 7, further comprising receiving, by the CN element, an authentication response message from the wireless communication device.

12. The method of claim 6, further comprising deriving, by the CN element, CN key material for integrity protection and ciphering of Non Access Stratum (NAS) communication.

13. The method of claim 12, further comprising transmitting, by the CN element, an NAS security mode command message for the first RAT and the second RAT to the wireless communication device, the NAS security mode command message enabling the wireless communication device to derive the CN key material for integrity protection and ciphering of NAS communication.

14. A method of supporting security context setup in a wireless communication network, the method comprising:
  establishing a first connection with a first communication network using a first Radio Access Technology (RAT);
  establishing a second connection with a second communication network using a second RAT, wherein the second RAT is different than the first RAT;
  receiving, by a wireless communication device of the wireless communication network and from a radio access network (RAN) element of the wireless communication network in a single common signaling procedure, information enabling the wireless communication to set up an Access Stratum (AS) security context for the first RAT and the second RAT; and
  setting up, by the wireless communication device, the AS security context for the first RAT and the second RAT.

15. The method of claim 14, further comprising receiving, by the wireless communication device and from the RAN element, a common AS security mode command message for the first RAT and the second RAT.

16. The method of claim 14, further comprising transmitting, by the wireless communication device to a core network (CN) element of the wireless communication network, information about security capabilities of the wireless communication device regarding the first RAT and the second RAT.

17. The method of claim 16, further comprising receiving, by the wireless communication device from a CN element, a request to perform authentication towards the CN element.

18. The method of claim 17, further comprising transmitting, by the wireless communication device, an authentication response message to the CN element.

19. The method of claim 14, further comprising:
receiving, by the wireless communication device, an Non Access Stratum (NAS) security mode command message for the first RAT and the second RAT from a core network (CN) element of the wireless communication network; and
deriving, by the wireless communication device, CN key material for integrity protection and ciphering of NAS communication for the first RAT and the second RAT from the received NAS security mode command message.

20. A radio access network (RAN) element for supporting security context setup in a wireless communication network, the RAN element comprising:
  processing circuitry;
  memory containing instructions executable by the processing circuitry whereby the RAN element is operative to:
    establish a first connection between a wireless communication device and a first communication network using a first Radio Access Technology (RAT);
    establish a second connection between the wireless communication device and a second communication network using a second RAT, wherein the second RAT is different than the first RAT; and
    initiate Access Stratum (AS) security context setup for the first RAT and the second RAT in a single common signaling procedure.

21. The RAN element of claim 20, wherein the RAN element is or comprises a part of a radio base station, a radio network controller, a NodeB, an eNodeB, a 5G radio unit controller, or a 5G base station.

22. A core network (CN) element for supporting security context setup in a wireless communication network, the CN element comprising:
  processing circuitry;
  memory containing instructions executable by the processing circuitry whereby the CN element is operative to:
    receive, from a wireless communication device having respective first and second established connections with a first Radio Access Technology (RAT) and a second RAT, security capabilities for the wireless communication device for both the first and second RATs, wherein the second RAT is different than the first RAT; and
    inform a radio access network (RAN) element of the wireless communication network to initiate Access Stratum (AS) security context setup for a first Radio Access Technology (RAT) and a second RAT in a single common signaling procedure.

23. A wireless communication device for supporting security context setup in a wireless communication network, the wireless communication device comprising:
  processing circuitry;
  memory containing instructions executable by the processing circuitry whereby the wireless communication device is operative to:
    establish a first connection with a first communication network using a first Radio Access Technology (RAT);
    establish a second connection with a second communication network using a second RAT, wherein the second RAT is different than the first RAT; and
    receive, from a radio access network (RAN) element and in a single common signaling procedure, information enabling the wireless communication device to set up an Access Stratum (AS) security context for the first and second RATs.

* * * * *

UNITED STATES PATENT AND TRADEMARK OFFICE
CERTIFICATE OF CORRECTION

| | | |
|---|---|---|
| PATENT NO. | : 10,506,438 B2 | Page 1 of 2 |
| APPLICATION NO. | : 15/500285 | |
| DATED | : December 10, 2019 | |
| INVENTOR(S) | : Yilmaz et al. | |

It is certified that error appears in the above-identified patent and that said Letters Patent is hereby corrected as shown below:

In the Specification

In Column 1, Lines 41-42, delete "in to" and insert -- into --, therefor.

In Column 3, Line 60, delete "comprising" and insert -- comprise --, therefor.

In Column 6, Line 14, delete "FIG. 6 a" and insert -- FIG. 6 is a --, therefor.

In Column 8, Line 30, delete "in to" and insert -- into --, therefor.

In Column 8, Line 48, delete "($K_{NASint}$," and insert -- ($K_{NASint}$, --, therefor.

In Column 8, Line 56, delete "step step1," and insert -- step 1, --, therefor.

In Column 8, Line 60, delete "step step2," and insert -- step 2, --, therefor.

In Column 9, Line 25, delete "($K_{NASint}$" and insert -- ($K_{NASint}$ --, therefor.

In Column 11, Line 8, delete "an Mobility" and insert -- a Mobility --, therefor.

In Column 13, Line 39, delete "5G" and insert -- 5G. --, therefor.

In Column 13, Line 53, delete "RATS" and insert -- RATs --, therefor.

In Column 14, Line 10, delete "RATS)" and insert -- RATs) --, therefor.

In Column 14, Line 13, delete "RATS" and insert -- RATs --, therefor.

In Column 14, Line 55, delete "step step2." and insert -- step 2. --, therefor.

Signed and Sealed this
Twelfth Day of May, 2020

Andrei Iancu
*Director of the United States Patent and Trademark Office*

CERTIFICATE OF CORRECTION (continued)
U.S. Pat. No. 10,506,438 B2

In Column 15, Line 48, delete "step step3." and insert -- step 3. --, therefor.

In Column 20, Line 30, delete "procedure" and insert -- procedure. --, therefor.

In Column 21, Line 8, delete "wireless communication device 6" and insert -- wireless communication device 60 --, therefor.